United States Patent
Elkayam et al.

(10) Patent No.: US 10,247,893 B1
(45) Date of Patent: Apr. 2, 2019

(54) OPTICAL CONNECTOR ASSEMBLIES AND OPTICAL CABLE ASSEMBLIES WITH SUPPLEMENTAL INPUT VOLTAGE

(71) Applicant: CORNING OPTICAL COMMUNICATIONS WIRELESS LTD, Airport City (IL)

(72) Inventors: Ori Elkayam, Airport City (IL); Ami Hazani, Ra'anana (IL)

(73) Assignee: Corning Optical Communications Wireless LTD, Airport City (IL)

( * ) Notice: Subject to any disclaimer, the term of this patent is extended or adjusted under 35 U.S.C. 154(b) by 0 days.

(21) Appl. No.: 15/819,031

(22) Filed: Nov. 21, 2017

(51) Int. Cl.
*G02B 6/42* (2006.01)
*H01R 25/00* (2006.01)
*H01R 13/66* (2006.01)

(52) U.S. Cl.
CPC ......... *G02B 6/4293* (2013.01); *H01R 13/665* (2013.01); *H01R 25/00* (2013.01)

(58) Field of Classification Search
CPC ... G02B 6/3817; G02B 6/4278; G02B 6/4293
See application file for complete search history.

(56) References Cited

U.S. PATENT DOCUMENTS

| 6,755,575 | B2* | 6/2004 | Kronlund | H04B 10/2504 385/73 |
| 6,756,772 | B2* | 6/2004 | McGinnis | H02M 3/07 323/225 |
| 7,331,819 | B2* | 2/2008 | Nelson | G02B 6/4201 385/88 |
| 7,447,437 | B2* | 11/2008 | Schunk | H04B 10/40 385/88 |
| 7,583,521 | B2* | 9/2009 | Nielsen | H02M 1/32 323/205 |
| 8,172,466 | B2* | 5/2012 | Uemura | G02B 6/4201 385/14 |
| 9,686,598 | B2* | 6/2017 | Siddhaye | G02B 6/4293 |

(Continued)

OTHER PUBLICATIONS

Corning 3. Optical USB AOC; [Online], < http://www.corning.com/optical-cables-by-corning/worldwide/en/products/usb-optical-cables.html>.; Jun. 2015; 1 Page.

(Continued)

*Primary Examiner* — Rhonda S Peace
(74) *Attorney, Agent, or Firm* — Michael E. Carroll, Jr.

(57) ABSTRACT

Optical connector assemblies and optical cable assemblies incorporating a supplemental input voltage are disclosed. In one embodiment, an optical connector assembly includes housing and an electrical connector at a face of the housing. The electrical connector includes an input voltage contact for receiving an input voltage. The optical connector assembly further includes voltage converter operable to convert the input voltage to an output voltage at a converter output, a voltage clamping device electrically coupled to the converter output, and a supplemental voltage conductor. The output voltage is greater than the input voltage. The supplemental voltage conductor is electrically coupled to an output of the voltage clamping device and provides a supplemental output voltage at an output of the voltage clamping device. The optical connector assembly further includes an active optical circuit that converts electrical data signals into optical signals.

27 Claims, 5 Drawing Sheets

(56) References Cited

U.S. PATENT DOCUMENTS

| | | | | |
|---|---|---|---|---|
| 9,977,208 B2* | 5/2018 | Huegerich | ............ | G02B 6/426 |
| 9,979,479 B2* | 5/2018 | Parekh | ................ | G02B 6/4293 |
| 2013/0236144 A1* | 9/2013 | Tong | ................... | G02B 6/4293 |
| | | | | 385/89 |
| 2016/0050029 A1* | 2/2016 | Huegerich | ........... | H04B 10/808 |
| | | | | 398/116 |
| 2016/0306127 A1* | 10/2016 | Jiang | ................... | G02B 6/4293 |
| 2017/0068061 A1* | 3/2017 | Yang | ................... | G02B 6/4284 |
| 2017/0222726 A1* | 8/2017 | Kubo | ................. | H04B 10/564 |
| 2018/0159633 A1* | 6/2018 | Kubo | ................. | G02B 6/4292 |

OTHER PUBLICATIONS

Everpro Technologies Company LTD., "U3HC, USB3.0 Hybrid Cable". acquired from http://www.everprotech.com/Products/5/15.aspx on Feb. 13, 2018; Admitted Art; 2 pages.

Everpro Technologies Company LTD., "U3HC, USB3.0 Hybrid Cable User Manual", acquired from http://www.everprotech.com/UploadFiles/files/admin/201602/U3HC%20User%20Manual.pdf on Feb. 13, 2018; Admitted Art; 3 Pages.

\* cited by examiner

OPTICAL CONNECTOR ASSEMBLIES AND OPTICAL CABLE ASSEMBLIES WITH SUPPLEMENTAL INPUT VOLTAGE

BACKGROUND

The present disclosure generally relates to optical connector assemblies and optical cable assemblies and, more particularly, to optical connector assemblies and optical cable assemblies providing supplemental input voltages for transmission of electrical power over an electrical conductor of a cable.

Benefits of optical fiber include extremely wide bandwidth and low noise operation. Because of these advantages, optical fiber is increasingly being used for a variety of applications, including, but not limited to, broadband voice, video, and data transmission. Active optical cables have electrical connectors that communicate data by optical data signals over one or more optical fibers. Particularly, each connector of the active optical cable includes an active optical circuit that converts the electrical data signals present at the connector into optical data signals for transmission over the one or more optical fibers. The connector at the opposite, distal end of the optical cable receives the optical data signals and another active optical circuit converts the optical data signals back into electric data signals for receipt by a connected electronic device.

It may be desirable for the active optical cable to also provide electric power over its length to a connected electronic device. For example, the active optical cable may be configured as a universal serial bus (USB) cable that provides electrical power provided by one electrical device (e.g., a master device) to another electrical device (e.g., a slave device) over one or more electrical conductors within the cable. However, due to ohmic losses in the one or more electrical conductors, the length of the cable is limited. The greater the length of the cable, the greater the voltage drop from one end of the cable to the other. Additionally, the active optical circuits in both ends of the active optical cable draw power from the input voltage of the master device. The voltage drop due to the ohmic losses in the one or more electrical conductors, as well as the power draw of the active optical circuits, may cause the electrical power at the distal end of the optical cable to be outside of specifications. Thus, the optical cable may be incapable providing enough power to the distally connected electrical device.

SUMMARY

Embodiments of the present disclosure are directed to optical connector assemblies and optical cable assemblies that utilize a supplemental voltage source to accommodate ohmic losses in the optical cable and the power draw of active optical circuits that provide electro-optical and opto-electrical conversion. The supplemental voltage enables the optical cable to provide electrical power at a distal end that is within desired specifications. In embodiments, an input voltage is increased by a voltage converter and combined with a supplemental voltage. As one non-limiting example, the input voltage may be 5V, and the converted input voltage and the supplemental voltage may be 24V. The combined electrical power is provided to one or more electrical conductors of the cable. The increased voltage reduces the ohmic losses provided by the electrical conductor of the cable.

The supplemental voltage may be provided by a second port of an electronic device that is then stepped up in voltage prior to being combined with the converted input voltage. In other embodiments, the supplemental voltage is already at the level of the increased input voltage. For example, the supplemental voltage may be 24V provided by an external power supply in some embodiments.

In this regard, in one embodiment, an optical connector assembly includes a housing and an electrical connector at a face of the housing. The electrical connector includes an input voltage contact for receiving an input voltage. The optical connector assembly further includes a voltage converter operable to convert the input voltage to an output voltage at a converter output, a voltage clamping device electrically coupled to the converter output, and a supplemental voltage conductor. The output voltage is greater than the input voltage. The supplemental voltage conductor is electrically coupled to an output of the voltage clamping device and provides a supplemental output voltage at an output of the voltage clamping device. The optical connector assembly further includes an active optical circuit that converts electrical data signals into optical signals.

In another embodiment, an optical connector assembly includes a first electrical contact for receiving an input voltage, a second electrical contact for receiving a supplemental input voltage, and a voltage converter for converting the input voltage to an output voltage. The output voltage is greater than the input voltage. The optical connector assembly further includes a voltage clamping device electrically coupled to an output of the voltage converter, a supplemental voltage converter for converting the supplemental input voltage to a supplemental output voltage, and a supplemental voltage clamping device electrically coupled to an output of the supplemental voltage converter. The supplemental output voltage is greater than the supplemental input voltage. An output of the supplemental voltage clamping device is electrically coupled to an output of the voltage clamping device. The optical connector assembly further includes an active optical circuit that converts electrical data signals into optical signals.

In yet another embodiment, an optical cable assembly includes a first connector assembly, a second connector assembly, and a cable. The first connector assembly includes a first housing and a first electrical connector at a face of the first housing. The first electrical connector has an input voltage contact for receiving an input voltage. The first connector assembly further includes a first voltage converter operable to convert the input voltage to an output voltage at a converter output, a voltage clamping device electrically coupled to the converter output, and a supplemental voltage conductor. The output voltage is greater than the input voltage. The supplemental voltage conductor is electrically coupled to an output of the voltage clamping device and provides a supplemental output voltage at an output of the voltage clamping device. The cable includes a first end coupled to the first housing of the first connector assembly, at least one electrical conductor electrically coupled to the output of the voltage clamping device, and at least one optical fiber. The second connector assembly is coupled a second end of the cable and includes a second housing and a second electrical connector at a face of the second housing. The second electrical connector includes a cable output voltage contact for providing a cable output voltage, and a second voltage converter coupled to the at least one electrical conductor. The second voltage converter is operable to convert a received voltage that is present at the at least one electrical conductor into the cable output voltage at the cable output voltage contact.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Embodiments described herein are directed to connector assemblies and optical cable assemblies that increase an input voltage to reduce power loss across an electrical conductor within a long cable. Particularly, embodiments described herein combine an input voltage with a supplemental input voltage to create a higher output voltage having increased electrical power such that a long active optical cable with an internal electrical conductor may provide power to a remote electrical device within predetermined specifications. Thus, embodiments combine power supplied from a primary host port and a secondary supplemental injection port. The input voltages from both ports are independently converted to a higher voltage for transmission over the cable, and combined at the higher level through low cost voltage clamping devices, such as Schottky diodes.

Various embodiments of optical connector assemblies and optical cable assemblies are described in detail below.

Figure 1:
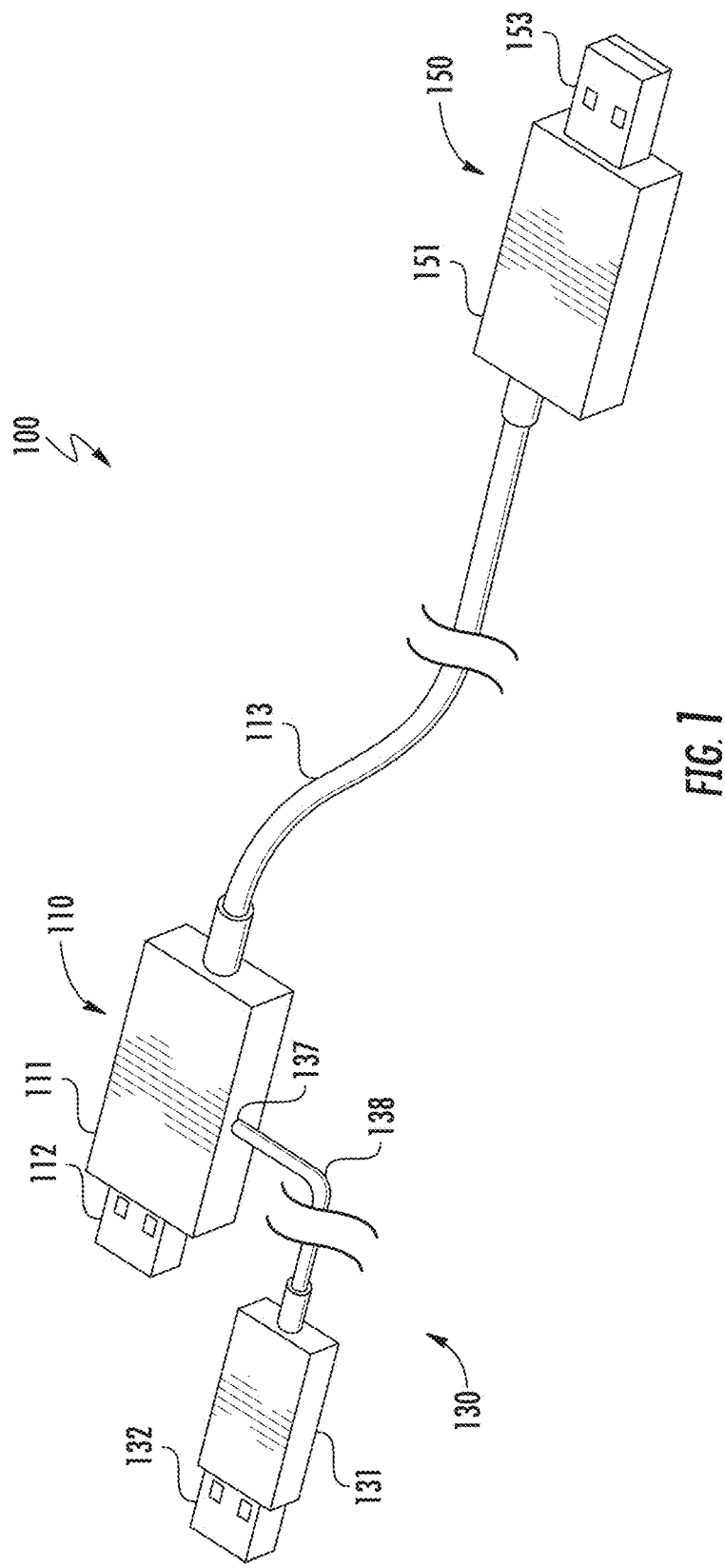
FIG. 1 schematically depicts an example optical cable assembly according to one or more embodiments described and illustrated herein.

Referring now to FIG. 1, an example optical cable assembly 100 is schematically illustrated. It should be understood that the example optical cable assembly 100 of FIG. 1 is provided for illustrative purposes only, and that other configurations and connector types are possible. In the illustrated embodiment, the example optical cable assembly 100 comprises a first connector assembly 110 at a first end of a cable 113 and a second connector assembly 150 at a second end of the cable 113. The first connector assembly 110 and the second connector assembly 150 are illustrated as Universal Serial Bus (USB) type-A plugs but embodiments are not limited thereto. It should be understood that the optical cable assemblies described herein may have any connector type.

The cable 113 comprises one or more optical fibers and one or more electrical conductors (i.e., wires) within a jacket. The one or more optical fibers and the one or more electrical conductors are not shown in FIG. 1. The first connector assembly 110 comprises a housing 111 and a first electrical connector 112 at a face of the housing 111. The first electrical connector 112 comprises electrical contacts for communicating electrical data signals as well as for providing electrical power to an electronic device connected to the second connector assembly 150. Similarly, the second connector assembly 150 comprises a second housing 151 and a second electrical connector 155 at a face of the second housing 151. The second electrical connector 155 also comprises electrical contacts for communicating electrical data signals as well as for receiving electrical power from an electronic device connected to the first connector assembly 110 by way of the one or more electrical conductors within the cable 113. The length of the cable 113 is not limited by this disclosure. In some embodiments, the cable may be greater than 40 m.

As described in more detail below, the optical cable assemblies described herein are active optical cable assemblies meaning that electrical data signals that are received by the first electrical connector from a connected electronic device are converted to optical signals by an active optical circuit for transmission over the one or more optical fibers within the cable (e.g., by modulating one or more light sources, such as lasers). These optical signals are then converted back into electrical data signals by an active optical circuit at the second connector assembly (e.g., by one or more photodetectors, such as photodiodes). Thus, the first connector assembly and the second connector assembly each include an active optical circuit capable of electrical-to-optical conversion as well as optical-to-electrical conversion.

The example optical cable assemblies further include one or more electrical conductors within the cable 113 for providing electrical power in addition to the one or more optical fibers. For example, the cable 113 may include a first electrical conductor for providing a ground reference and a second electrical conductor for providing a positive voltage reference. Thus, an electronic device connected to the second connector assembly 150 may receive electrical power from an electronic device connected to the first connector assembly 110. The active optical circuits of the first connector assembly 110 and the second connector assembly 150 receive electrical power from the electronic device connected to the first connector assembly 110. However, due to ohmic losses on the one or more conductors within the cable 113 due to the length of the cable 113 (e.g., greater than 40 m), and the power draw required by the active optical circuits, not enough electrical power may be present at the second electrical connector 155 to power a connected electrical device within predetermined specifications. Additionally, the gauge of the electrical conductor 120 may also affect ohmic losses. It is desirable to have a thin-gauged electrical conductor 120 to minimize the diameter and maximize the flexibility of the cable 113. Any gauge may be utilized. In one non-limiting example, the gauge of the electrical conductor 120 is 22 AWG providing 6Ω of resistance at 50 m.

The optical cable assemblies described herein provide supplemental power at the first connector assembly 110 to ensure that enough electrical power is provided over the cable 113 such that the electrical power at the second electrical connector 155 is within predetermined specifications (e.g., within voltage and wattage specifications). Various methods and devices for providing supplemental power to the first connector assembly 110 and the one or more electrical conductors within the cable 113 are described in detail below.

Referring once again to FIG. 1, the example optical cable assembly 100 further comprises a supplemental cable 138 that is coupled to the housing 111 of the first connector assembly 110. In the illustrated embodiment, the supplemental cable 138 is further coupled to a supplemental connector assembly 130 comprising a supplemental housing 131 and a supplemental electrical connector 132 at a face of the supplemental housing 131. The supplemental electrical connector 132 includes a supplemental voltage contact (not shown) for receiving supplemental input voltage. The example supplemental connector assembly 130 is depicted as a USB type-A connector similar to the first connector assembly 110. Thus, a user may plug the optical cable assembly 100 into two USB ports of an electrical device such that electrical power is received from both USB ports. As described in more detail below, the supplemental electrical power received by the supplemental connector assembly 130 ensures that the electrical power provided at the second electrical connector 155 satisfies desired specifications.

In some embodiments, the supplemental cable 138 is permanently coupled to the housing 111 of the first connector assembly 110, such as at location 137. In other embodiments, the supplemental cable 138 may be removably coupled to the housing 111 of the first connector assembly 110. For example, a removable electrical connection may be provided at location 137, thereby allowing the supplemental cable 138 to be connected and disconnected.

Figure 2:
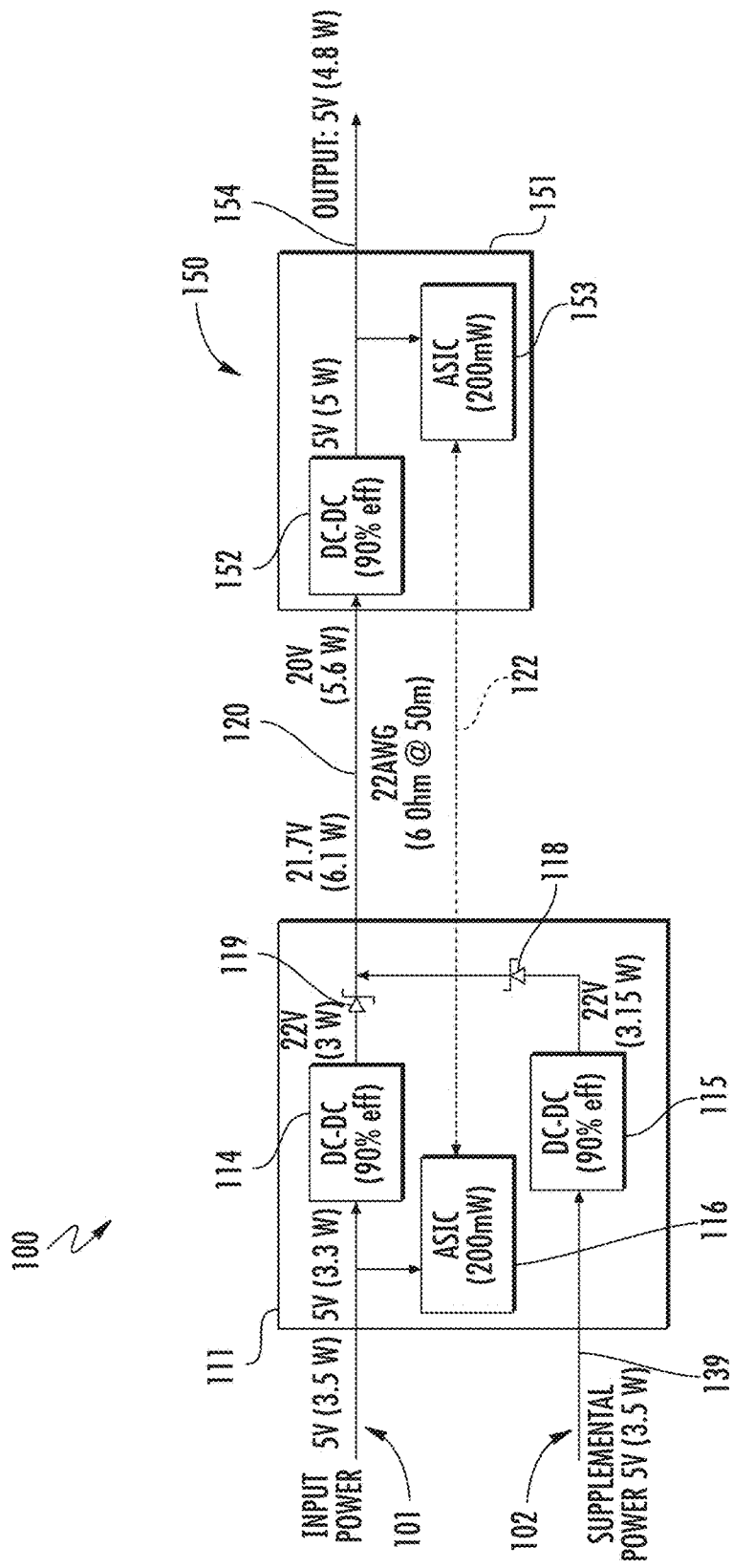
FIG. 2 schematically depicts internal components of the example optical cable assembly depicted by FIG. 1 wherein a voltage converter and a supplemental voltage converter are provided within a first connector assembly according to one or more embodiments described and illustrated herein.

Referring now to FIG. 2, internal components of the first connector assembly 110 and the second connector assembly 150 are schematically depicted. It should be understood that the schematic depicted in FIG. 2 (as well as FIGS. 3-5) is simplified, and eliminates many components for ease of illustration.

The first connector assembly 110 receives an input voltage 101 (e.g., Vbus of a USB receptacle) at the first electrical connector 112. In the illustrated embodiment, the input voltage is 5V at 3.5 W. However, embodiments are not limited thereto. The voltage and power provided of the input voltage may be determined by the connector specification. For example, the specification may be 900 mA at 4.75V-5.25V. The input voltage 101 is provided to an active optical circuit 116 operable to convert electrical data signals (e.g., electrical data signals on data contacts of the first electrical connector 112) into optical data signals for transmission on the one or more optical fibers 122. Further, the active optical circuit 116 is also operable to convert optical data signals received from the one or more optical fibers 122 into electrical data signals (e.g., electrical data signals provided on data contacts of the first electrical connector 112). Thus the input voltage 101 powers the active optical circuit 116, which in the non-limiting example consumes 200 mW of electrical power.

The input voltage 101 is also provided to a voltage converter 114, which in the non-limiting embodiment is a direct-current (DC) to DC converter with 90% efficiency. It should be understood that any known or yet-to-be-developed voltage converter may be utilized. The voltage converter 114 converts the input voltage to a higher output voltage. The output voltage provided by the voltage converter 114 is not limited by this disclosure. For example, the output voltage may be less than or equal to 60V. In the non-limiting example of the illustrated embodiment, the output voltage is 22V. However, it should be understood that other voltages may be produced by the voltage converter 114.

The output of the voltage converter 114 (i.e., the converter output) is electrically coupled to a voltage clamping device 119 that is used to isolate the voltage converter 114 from other electrical components, such as the supplemental voltage converter 115 described below. In the illustrated example, the voltage clamping device 119 is a Schottky diode. However, other components for isolating the voltage converter 114 may be utilized, such as a power management integrated circuit (IC). Referring to FIG. 2, due to the voltage drop of the voltage clamping device 119, the output voltage at the cathode side of the Schottky diode is 21.7V at a power of 6.1 W. The cathode side of the Schottky diode (i.e., the output of the voltage clamping device 119) is electrically coupled to an electrical conductor 120 disposed within the cable 113.

As stated above, the power draw of the active optical circuit 116 and the ohmic losses of the electrical conductor 120 may reduce the electrical power provided at the second electrical connector 155 such that it is not within specification requirements. Thus, supplemental power is provided to the first connector assembly 110.

In the embodiment illustrated by FIG. 2, a supplemental input voltage 102 is provided to the first connector assembly 110. The supplemental input voltage is 5V as a non-limiting example. Briefly referring to FIG. 1, the supplemental input voltage may be provided by the supplemental connector assembly 130, which may be coupled to the first connector assembly by a supplemental voltage conductor 139 of a supplemental cable 138. As an example and not a limitation, the 5V supplemental input voltage may be provided by a USB port to which the supplemental connector assembly 130 is connected. It should be understood that the supplemental cable 138 may also include an electrical conductor for providing a ground reference.

The first connector assembly 110 further includes a supplemental voltage converter 115 that receives the supplemental input voltage 102. The supplemental voltage converter 115 may be a DC-DC converter similar to the voltage converter 114. The supplemental voltage converter 115 is configured to convert the supplemental input voltage into a higher supplemental output voltage. The supplemental output voltage may be substantially equal to the output voltage of the voltage converter 114. In the non-limiting embodiment depicted by FIG. 2, the supplemental output voltage is 22V.

The output of the supplemental voltage converter 115 (i.e., the supplemental converter output) is electrically coupled to a supplemental voltage clamping device 118 that is used to isolate the supplemental voltage converter 115 from other electrical components, such as the voltage converter 114. In the illustrated example, the supplemental voltage clamping device 118 is a Schottky diode. However, other components for isolating the supplemental voltage converter 115 may be utilized, such as a power management IC. Referring to FIG. 2, due to the voltage drop of the supplemental voltage clamping device 118, the output voltage at the cathode side of the Schottky diode is 21.7V at a power of 6.1 W. The cathode side of the Schottky diode (i.e., the output of the supplemental voltage clamping device 118)

is electrically coupled to the electrical conductor 120 and the output of the voltage clamping device 119. In the example embodiment of FIG. 2, 21.7V at 6.1 W is present at the end of the electrical conductor within the first connector assembly 110. However, it should be understood that embodiments are not limited thereto. Thus, increased electrical power is provided to the one or more electrical conductors by the supplemental input voltage 102.

Increasing the voltage on the electrical conductor from the input voltage provided by the receptacle (e.g., a USB port) reduces the ohmic losses caused by the length and gauge of the electrical conductor 120. As shown in FIG. 2, the voltage at an end of the electrical conductor 120 within the second connector assembly is less than the voltage at the end of the electrical conductor 120 within the first connector assembly 110. In the non-limiting, illustrated example, the electrical conductor 120 is 50 m in length and has a gauge of 22 AWG, which reduces the voltage on the electrical conductor 120 at the second connector assembly 150 to 20V and the power to 5.62 W. Such a reduction in voltage is less than if the original 5V was provided on the electrical conductor 120.

The second connector assembly 150 includes a second voltage converter 152, which is configured as a DC-DC converter that is configured to reduce the voltage provided on the electrical conductor 120 (i.e., the received voltage) to substantially equal to the input voltage 101. The second voltage converter 152 may be configured as any known or yet-to-be-developed DC-DC converter. In the illustrated example, the second voltage converter 152 receives approximately 20V at 5.6 W of power and converts it to 5V at 5 W of power due to inefficiencies of the DC-DC converter (e.g., 90% efficiency in the illustrated example). The output voltage of the second voltage converter 152 is provided to the second active optical circuit 153, which converts optical data signals to electrical data signals and vice-versa. In the illustrated example, the second active optical circuit consumes 200 mW of power, which leaves 5V at 4.8 W available as a cable output voltage 154 that may be provided on a cable output voltage contact within the second electrical connector 155. Thus, the optical cable assembly 100 provides a cable output voltage 154 for powering an external electronic device that is within desired specifications. It should be understood that the voltages, power ratings, currents and other parameters described and illustrated herein are for illustrative purposes only, and that other parameter values may be utilized depending on the application.

Figure 3:
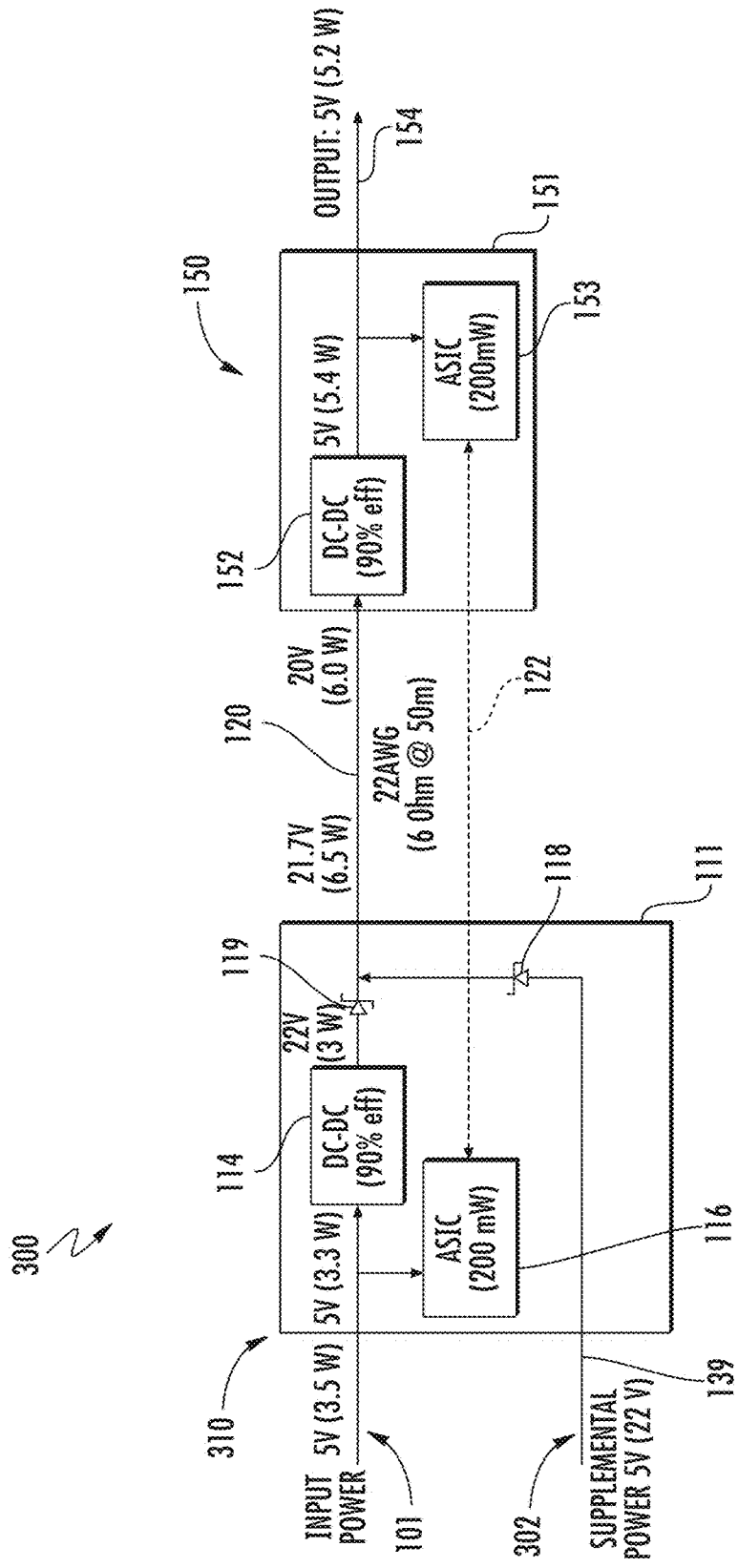
FIG. 3 schematically depicts internal components of another example optical cable assembly wherein a voltage converter is provided in a first connector assembly and supplemental voltage is provided directly to the first optical assembly by a power supply according to one or more embodiments described and illustrated herein.

FIG. 3 schematically depicts another example optical cable assembly 300. In the optical cable assembly 300 depicted by FIG. 3, the higher supplemental output voltage 302 is provided directly to the first connector assembly 310. Thus, the first connector assembly 310 includes only one voltage converter 114 that increases the input voltage 101 as described above. The supplemental output voltage 302 may be provided by any source. As an example and not a limitation, the supplemental output voltage 302 may be provided by the supplemental cable 138 depicted by FIG. 1. Instead of the supplemental connector assembly 130 shown in FIG. 1, the distal end of the supplemental cable 138 may be terminated by a power supply (not shown), which may be a battery or an output plug comprising an alternating current (AC) to DC converter, for example. In the non-limiting example of FIG. 3, the supplemental output voltage 302 that is provided to the first connector assembly 110 is 22V and 3.5 W. The supplemental output voltage 302 is provided at the output of the voltage clamping device 119. The optical cable assembly 300 operates in a similar manner as described above with respect to the example optical cable assembly 100 depicted in FIG. 2.

Figure 4:
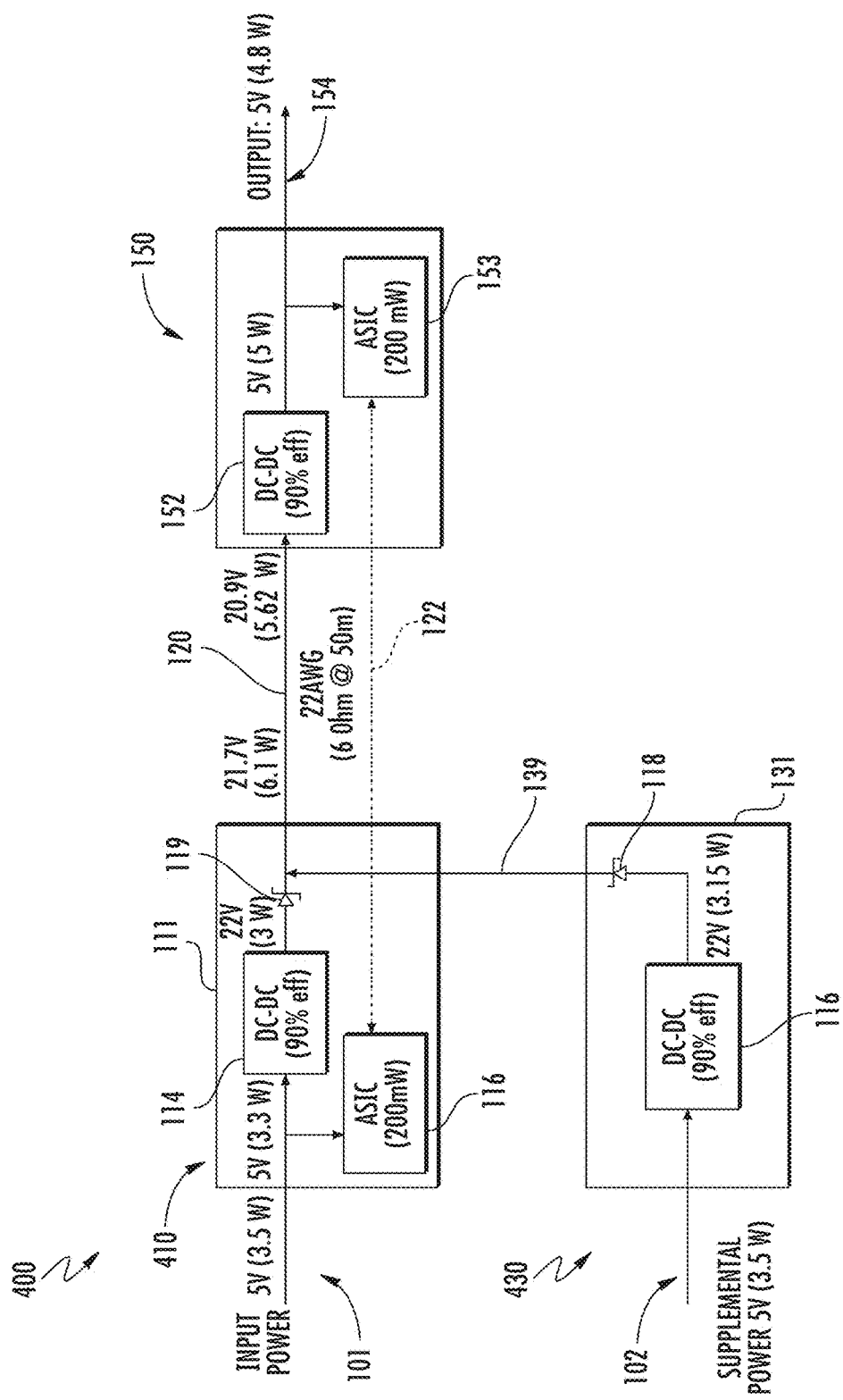
FIG. 4 schematically depicts internal components of another example optical cable assembly wherein a voltage converter is provided in a first connector assembly and a supplemental voltage converter is provided in a supplemental connector assembly according to one or more embodiments described and illustrated herein.

Another example optical cable assembly 400 is schematically depicted by FIG. 4. In the optical cable assembly 400 of FIG. 4, the supplemental voltage converter 115 is disposed in the supplemental housing 131 of the supplemental connector assembly 430 rather than within the housing 111 of the first connector assembly 410. The supplemental connector assembly 430 and the first connector assembly 410 may be configured as connectors according to a desired connector standard such as, without limitation, USB type-A connectors. Thus, the supplemental input voltage 102 is received by the supplemental connector assembly 430, and is converted to the higher supplemental output voltage by the supplemental voltage converter 115. In the illustrated embodiment, the supplemental voltage clamping device 118 is also disposed within the supplemental connector assembly 430. The output of the supplemental voltage clamping device 118 (e.g., the cathode of a Schottky diode) is electrically coupled to a supplemental voltage conductor 139 within the supplemental cable 138 that is electrically coupled to the output of the voltage clamping device 119 within the first connector assembly 410. Thus, the supplemental output voltage is provided to the first connector assembly 410. In other embodiments, the supplemental voltage clamping device 118 may be disposed within the first connector assembly 410 such that the output of the supplemental voltage converter 115 is electrically coupled to the supplemental voltage clamping device 118 by the supplemental voltage conductor 139 within the supplemental cable 138.

It is noted that the output voltages of the voltage converters described herein have finite accuracy, thereby resulting in different current-loading of the output port of the voltage converter. Each of the voltage converters may also have an internal control circuit that is designed such that the output voltage is dramatically reduced when overloaded by high current consumption by its load. When the load consumes more than the power available from a single voltage converter, and the outputs of the two voltages converters are unbalanced, an overload mode may be detected. This may cause one of the voltage converters to reduce its output voltage. Following the overload of the one voltage converter, the other converter output may be immediately be overloaded, as the total load current is higher than what a single voltage converter can supply. This situation introduces instability of the output voltage.

Figure 5:
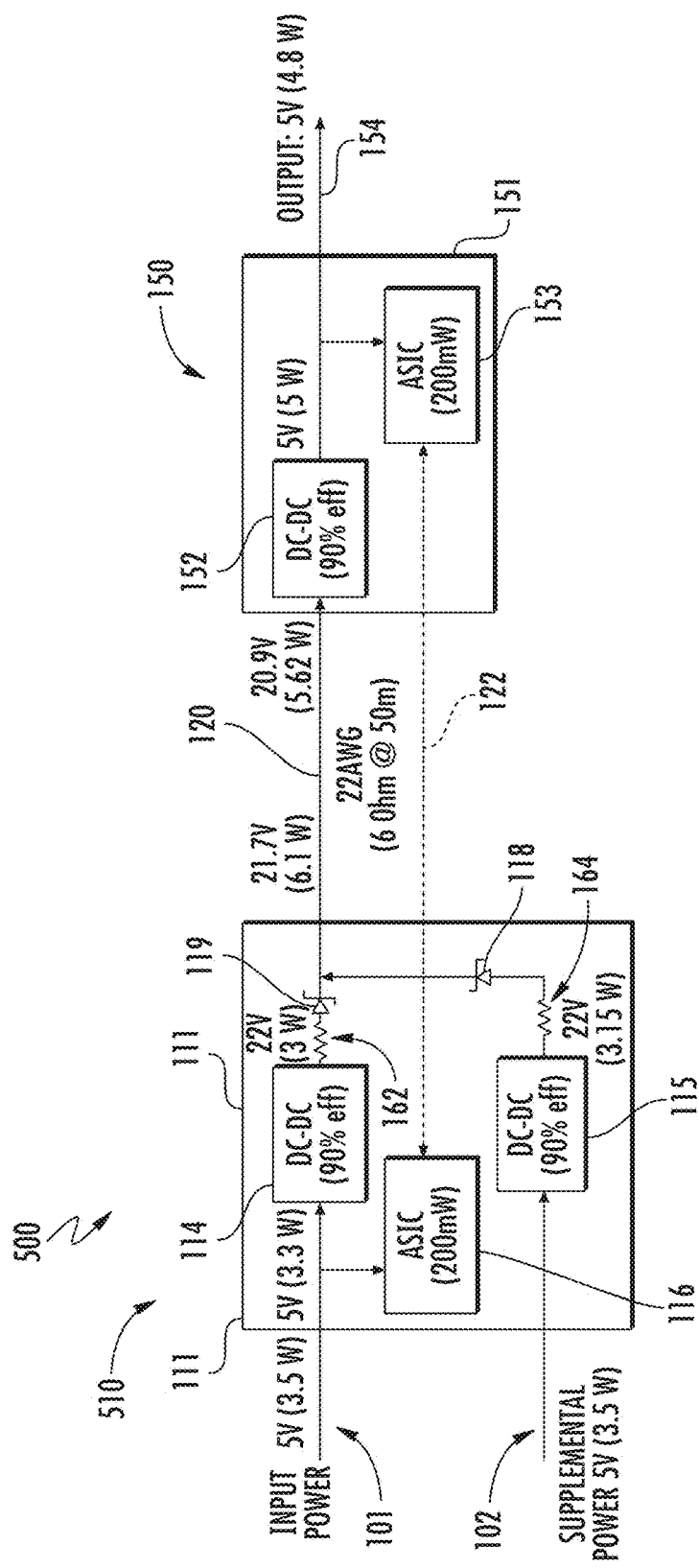
FIG. 5 schematically depicts internal components of the optical cable assembly depicted by FIG. 2 also including a first resistor and a supplemental resistor for preventing overload conditions according to one or more embodiments described and illustrated herein.

Referring to FIG. 5, another example optical cable assembly 500 is schematically depicted that avoids an overload mode of a single voltage converter by including resistor 162 and supplemental resistor 164 in the first connector assembly 510. Particularly, resistor 162 is electrically coupled to the output of the voltage converter 114 and an input of the voltage clamping device 119. Supplemental resistor 164 is electrically coupled to the output of the supplemental voltage converter 115 and an input of the supplemental voltage clamping device 118.

In the presence of the series resistors 162, 164, if one of the voltage converters 114, 115 starts to get into an overload mode, as its voltage starts to drop, the current will also drop as the voltage of the series resistor 162, 164 drops. As a result, the line voltage will drop gradually and the output voltage of the other of the voltage converters 114, 115 will start to drive current towards the line. Resistor 162 and supplemental resistor 164 thus provide a wider voltage range that allows both voltage converters 114, 115 to drive the line and thus a more stable condition is reached.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. An optical connector assembly comprising:
   a housing;
   an electrical connector at a face of the housing, the electrical connector comprising an input voltage contact for receiving an input voltage;
   a direct-current (DC) voltage converter operable to convert the input voltage to an output voltage at a converter output, wherein the output voltage is greater than the input voltage;
   a voltage clamping device electrically coupled to the converter output;
   a supplemental voltage conductor, wherein the supplemental voltage conductor is electrically coupled to an output of the voltage clamping device and provides a supplemental output voltage at an output of the voltage clamping device; and
   an active optical circuit that converts electrical data signals into optical signals.

2. The optical connector assembly of claim 1, wherein the supplemental output voltage is substantially equal to the output voltage.

3. The optical connector assembly of claim 1, further comprising a cable extending from the housing, and at least one electrical conductor disposed within the cable, wherein the at least one electrical conductor is electrically coupled to the output of the voltage clamping device.

4. The optical connector assembly of claim 3, wherein the cable is greater than or equal to 40 meters.

5. The optical connector assembly of claim 3, further comprising at least one optical fiber disposed within the cable.

6. The optical connector assembly of claim 5, wherein:
   the electrical connector comprises one or more data contacts; and the active optical circuit converts electrical data signals at the one or more data contacts into optical signals for transmission on the at least one optical fiber.

7. The optical connector assembly of claim 6, wherein the input voltage powers the active optical circuit.

8. The optical connector assembly of claim 1, wherein the supplemental voltage conductor extends into the housing.

9. The optical connector assembly of claim 1, further comprising:
   a supplemental DC voltage converter operable to receive a supplemental input voltage and convert the supplemental input voltage to the supplemental output voltage at a supplemental converter output; and
   a supplemental voltage clamping device electrically coupled to the supplemental converter output, wherein an output of the supplemental voltage clamping device is electrically coupled to the output of the voltage clamping device.

10. The optical connector assembly of claim 9, further comprising: a resistor electrically coupled to the converter output and an input of the voltage clamping device; and a supplemental resistor electrically coupled to the supplemental converter output and an input of the supplemental voltage clamping device.

11. The optical connector assembly of claim 9, further comprising a supplemental connector assembly comprising:
   a supplemental housing; and
   a supplemental electrical connector at a face of the supplemental housing, wherein:
      the supplemental electrical connector comprises a supplemental voltage contact for receiving the supplemental input voltage; and
      the supplemental voltage conductor is electrically coupled to the supplemental voltage contact; and
   a supplemental cable coupled to the supplemental housing and the housing, wherein the supplemental voltage conductor is disposed within the supplemental cable.

12. The optical connector assembly of claim 11, wherein the supplemental DC voltage converter and the supplemental voltage clamping device are disposed within the housing.

13. The optical connector assembly of claim 11, wherein the supplemental DC voltage converter and the supplemental voltage clamping device are disposed within the supplemental housing.

14. The optical connector assembly of claim 11, wherein the supplemental cable is removably coupled to the housing.

15. An optical connector assembly comprising:
   a first electrical contact for receiving an input voltage;
   a second electrical contact for receiving a supplemental input voltage;
   a voltage converter for converting the input voltage to an output voltage, wherein the output voltage is greater than the input voltage;
   a voltage clamping device electrically coupled to an output of the voltage converter;
   a supplemental voltage converter for converting the supplemental input voltage to a supplemental output voltage, wherein the supplemental input voltage is greater than the supplemental input voltage;
   a supplemental voltage clamping device electrically coupled to an output of the supplemental voltage converter, wherein an output of the supplemental voltage clamping device is electrically coupled to an output of the voltage clamping device; and
   an active optical circuit that converts electrical data signals into optical signals.

16. The optical connector assembly of claim 15, wherein the first electrical contact is operable to be inserted into a first port and the second electrical contact is operable to be inserted into a second port.

17. An optical cable assembly comprising:
   a first connector assembly comprising:
      a first housing;
      a first electrical connector at a face of the first housing, the first electrical connector comprising an input voltage contact for receiving an input voltage;
      a first voltage converter operable to convert the input voltage to an output voltage at a converter output, wherein the output voltage is greater than the input voltage;
      a voltage clamping device electrically coupled to the converter output; and
      a supplemental voltage conductor, wherein the supplemental voltage conductor is electrically coupled to an output of the voltage clamping device and provides a supplemental output voltage at an output of the voltage clamping device;
   a cable, the cable comprising:

a first end coupled to the first housing of the first connector assembly;
at least one electrical conductor electrically coupled to the output of the voltage clamping device; and
at least one optical fiber;
a second connector assembly coupled a second end of the cable, the second connector assembly comprising:
a second housing;
a second electrical connector at a face of the second housing, the second electrical connector comprising a cable output voltage contact for providing a cable output voltage; and
a second voltage converter coupled to the at least one electrical conductor, wherein the second voltage converter is operable to convert a received voltage that is present at the at least one electrical conductor into the cable output voltage at the cable output voltage contact.

18. The optical cable assembly of claim 17 wherein a length of the cable is greater than or equal to 40 m, and the second input voltage at the second input voltage contact of second electrical connector is within ten percent of the input voltage at the input voltage contact of the first electrical connector.

19. The optical cable assembly of claim 17, wherein the supplemental output voltage is substantially equal to the output voltage.

20. The optical cable assembly of claim 17, wherein each of the first electrical connector and the second electrical connector comprises an active optical circuit, wherein the active optical circuit converts electrical data signals into optical signals for transmission on the at least one optical fiber, and optical signals from the at least ore optical fiber into electrical data signals.

21. The optical cable assembly of claim 17, wherein the supplemental voltage conductor extends into the first housing.

22. The optical cable assembly of claim 17, further comprising:

a supplemental voltage converter operable to receive a supplemental input voltage and convert the supplemental input voltage to the supplemental output voltage at a supplemental converter output; and
a supplemental voltage clamping device electrically coupled to the supplemental converter output, wherein an output of the supplemental voltage clamping device is electrically coupled to the output of the voltage clamping device.

23. The optical cable assembly of claim 22, further comprising:
a resistor electrically coupled to the converter output and an input of the voltage clamping device; and
a supplemental resistor electrically coupled to the supplemental converter output and an input of the supplemental voltage clamping device.

24. The optical cable assembly of claim 22, further comprising a supplemental connector assembly comprising:
a supplemental housing; and
a supplemental electrical connector at a face of the supplemental housing, wherein:
the supplemental electrical connector comprises a supplemental voltage contact for receiving the supplemental input voltage; and
the supplemental voltage conductor is electrically coupled to the supplemental voltage contact; and
a supplemental cable coupled to the supplemental housing and the first housing, wherein the supplemental voltage conductor is disposed within the supplemental cable.

25. The optical cable assembly of claim 24, wherein the supplemental voltage converter and the supplemental voltage clamping device are disposed within the first housing.

26. The optical cable assembly of claim 24, wherein the supplemental voltage converter and the supplemental voltage clamping device are disposed within the supplemental housing.

27. The optical cable assembly of claim 24, wherein the supplemental cable is removably coupled to the first housing.

* * * * *

UNITED STATES PATENT AND TRADEMARK OFFICE
CERTIFICATE OF CORRECTION

PATENT NO. : 10,247,893 B1  
APPLICATION NO. : 15/819031  
DATED : April 2, 2019  
INVENTOR(S) : Ori Elkayam et al.

Page 1 of 1

It is certified that error appears in the above-identified patent and that said Letters Patent is hereby corrected as shown below:

In the Claims

In Column 11, Line 34 (approx.), Claim 20, delete "ore" and insert -- one --, therefor.

Signed and Sealed this
Tenth Day of September, 2019

Andrei Iancu
*Director of the United States Patent and Trademark Office*